United States Patent [19]

Witdoek et al.

[11] Patent Number: 4,511,348
[45] Date of Patent: Apr. 16, 1985

[54] DRIVE TENSIONING APPARATUS

[75] Inventors: Daniel C. Witdoek, Hooglede; André G. J. Dhont, Maldegem, both of Belgium

[73] Assignee: Sperry Corporation, New Holland, Pa.

[21] Appl. No.: 391,773

[22] Filed: Jun. 24, 1982

[51] Int. Cl.³ ............................................. F16H 7/12
[52] U.S. Cl. .................................. 474/109; 474/133; 474/134
[58] Field of Search ............... 474/109, 133, 134, 135; 56/11.6

[56] References Cited

U.S. PATENT DOCUMENTS

| | | | |
|---|---|---|---|
| 2,066,721 | 1/1937 | Eaton | 474/109 |
| 2,726,364 | 12/1955 | Merritt | 474/109 X |
| 2,766,417 | 10/1956 | Merritt | 474/109 X |
| 3,054,299 | 9/1962 | Procter . | |
| 3,380,313 | 4/1968 | Bulin . | |
| 3,525,269 | 9/1970 | Peters . | |
| 3,817,114 | 6/1974 | Klee . | |
| 4,069,719 | 1/1978 | Cancilla | 474/134 |
| 4,128,952 | 12/1978 | Duke et al. . | |
| 4,191,062 | 3/1980 | Gardner . | |
| 4,312,267 | 1/1982 | Shenberger | 474/135 X |
| 4,400,930 | 8/1983 | Huhman et al. | 474/70 X |

FOREIGN PATENT DOCUMENTS

| | | | |
|---|---|---|---|
| 901838 | 6/1972 | Canada . | |
| 1935594 | 7/1970 | Fed. Rep. of Germany | 56/11.6 |
| 1782519 | 9/1971 | Fed. Rep. of Germany . | |
| 7528162 | 10/1976 | Fed. Rep. of Germany . | |
| 2188742 | 1/1974 | France . | |
| 1183808 | 3/1970 | United Kingdom | 474/135 |
| 745418 | 7/1980 | U.S.S.R. . | |

*Primary Examiner*—Lawrence J. Staab
*Assistant Examiner*—Dwight G. Diehl
*Attorney, Agent, or Firm*—Larry W. Miller; Frank A. Seemar; Darrell F. Marquette

[57] ABSTRACT

A tensioning apparatus for a power transfer mechanism utilizing an endless flexible member having a normally slack run and a normally taut run is disclosed wherein the tensioning apparatus is operable to take up the slack in the endless member under both normal operating conditions and reverse power conditions during which the normally slack run becomes taut and vice-versa. The tensioning apparatus varies the amount of tensioning force applied to each run of the endless member in response to the amount of tension within the respective run. A constant biasing force is applied to a pair of tensioning idlers through an elongated rod which positionally changes relative to the tensioning idler pivots to vary the amount of tensioning force applied by the tensioning idlers.

19 Claims, 9 Drawing Figures

DRIVE TENSIONING APPARATUS

BACKGROUND OF THE INVENTION

The present invention relates generally to drives for crop harvesting machinery and, more particularly, to a belt tensioning apparatus for transferring driving power from the engine to drive a combine harvester.

Belt drives transferring rotational power from a primary mover, such as an engine, to the harvesting apparatus or other drive components which are to be driven are well known. Typically, an endless belt or chain is entrained about a pair of pulleys or sprockets connected, respectively, to the power output shaft of the engine and the power input shaft of the harvester driven component. The belt will have two runs spanning the distance between the two pulleys. Depending upon the direction of power transmission, one of the runs between the drive pulley and the driven pulley will be taut and the other run will be slack.

To keep the slack side or run of the belt in proper engagement with the pulleys to enable an efficient transfer of power therebetween, a tensioning device having one or more tensioning pulleys or sprockets engageable with the slack side of the belt or chain is provided to take up the slack and properly tension the slack run of the endless member. Examples of such tensioning devices can be seen in U.S. Pat. No. 4,312,267 and in U.S. Pat. No. 3,525,269. These tensioning devices operate satisfactorily under normal operating conditions; however, under reverse power conditions, wherein the driven pulley or sprocket is driving the drive pulley or sprocket, the normally slack run becomes the taut side of the belt or chain and the normally taut run becomes slack.

Reverse power conditions can occur when the combine is going downhill. Power from the engine is cut back and gravity can cause the power input shaft to deliver more power to the belt than it is receiving from the power output shaft of the engine, whereby the direction of power transfer may be reversed with power flowing from the combine to the engine. Unless it is properly tensioned, the belt may slip on the pulleys and prevent the engine from braking the combine. Belts or chains can also become disengaged from the pulley or sprockets respectively and completely disrupt the drive transfer mechanism.

This problem is recognized relative to a drive for a motorcycle in U.S. Pat. No. 4,069,719 in which a tensioning device has a sprocket engageable with each run of an endless chain. Other drives having a tensioning idler engageable with each run of the endless flexible member can be found in U.S. Pat. Nos. 4,128,952 and 4,191,062. However, it has been found that the use of a tensioning idler to exert a tensioning force on the already taut side of a drive belt drastically reduces the life of the belt. Accordingly, it would be desirable to provide a tensioning apparatus that is operable to tension the slack side of the belt and provide minimal tensioning force on the taut side of the belt during normal operating conditions and further operable to tension the normally taut side of the belt during the aforementioned reverse power conditions while providing minimal tensioning forces to the normally slack side.

SUMMARY OF THE INVENTION

It is an object of this invention to overcome the aforementioned disadvantages of the prior art by providing a tensioning apparatus for a belt drive on a combine harvester that is operable to take up the slack in either run of the belt while exerting only minimal tensioning forces on the opposing side of the belt.

It is another object of this invention to provide a tensioning apparatus for an endless flexible power transfer mechanism that provides a variable amount of tensioning force to each run of the endless member depending on the amount of tension in the respective run of the endless member.

It is a feature of this invention that a tensioning force is exerted on each run of an endless flexible member in a power transfer mechanism by applying moment to a pivotally mounted support arm.

It is another feature of this invention that the length of the moment arm for a pivotally mounted tensioning idler can be changed to vary the tensioning force applied to the belt.

It is an advantage of this invention that the tensioning force applied to a belt drive by a tensioning idler can be varied without changing the force applied to the tensioning idler by the biasing mechanism.

It is another advantage of this invention that a tensioning idler is engageable with the taut run of an endless drive belt without significantly reducing the operating life of the belt.

It is still another object of this invention to provide a belt drive tensioning apparatus having two tensioning members engageable, respectively, with each run of the belt and interconnected with each other to effect a simultaneous movement for tensioning under opposing operating conditions.

It is still another feature of this invention that the slack in an endless drive member is automatically taken up whenever the power transfer mechanism changes from a normal operating condition to a reverse power condition.

It is a further object of this invention to provide a tensioning apparatus for a power transfer mechanism using an endless flexible member which is durable in construction, inexpensive of manufacture, carefree of maintenance, facile in assemblage and simple and effective in use.

These and other objects, features and advantages are accomplished according to the instant invention by providing a tensioning apparatus for a power transfer mechanism utilizing an endless flexible member having a normally slack run and a normally taut run wherein the tensioning apparatus is operable to take up the slack in the endless member under both normal operating conditions and reverse power conditions during which the normally slack run becomes taut and vice versa. The tensioning apparatus varies the amount of tensioning force applied to each run of the endless member in response to the amount of tension within the respective run. A constant biasing force is applied to a pair of tensioning idlers through an elongated rod which positionally changes relative to the tensioning idler pivots to vary the amount of tensioning force applied by the tensioning idlers.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
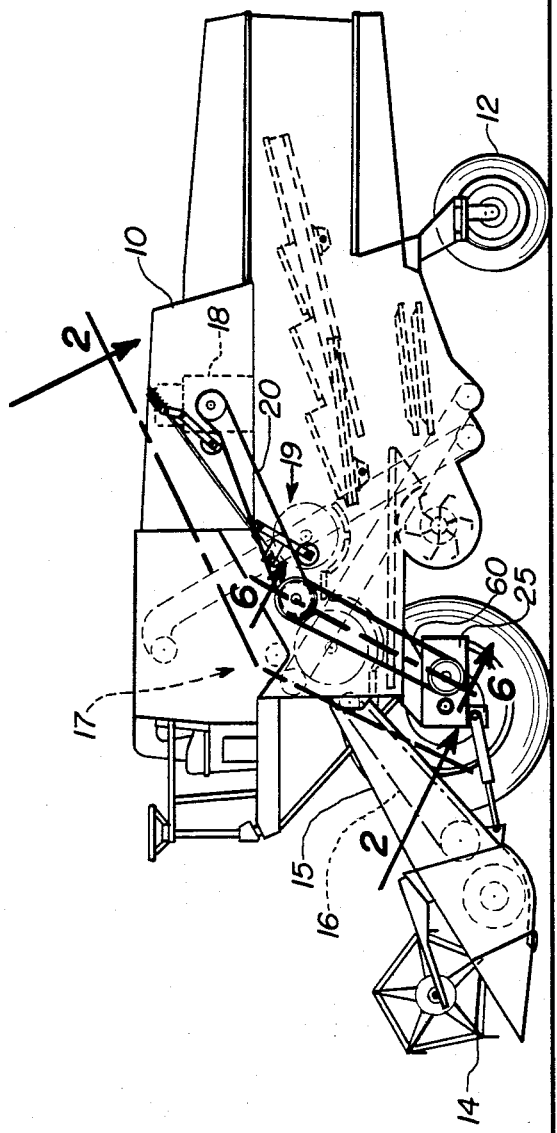
FIG. 1 is a side elevational view of a mobile crop harvesting machine, commonly referred to as a combine, incorporating the principles of the instant invention.

Referring now to the drawings and, particularly, to FIG. 1, a side elevational view of a crop harvesting machine, commonly referred to as a combine, can be seen. The combine base unit 10 includes a wheeled frame 12 onto which is supported a forwardly mounted crop harvester header 14 operable to sever standing crop material and initiate the crop harvesting process. A feeder house 15 interconnects the header 14 and the base unit 10 and houses a conveyor 16 for transferring severed crop material rearwardly from the header 14.

Threshing and cleaning apparatus 17 is suitably housed within the base unit 10 rearwardly of the feeder house 15 to receive the severed crop material therefrom and subsequently separate the edible grain crop from the trash material, as is well known in the art. An engine 18 is supported by the frame 12 and is the source of driving power for operating the various components of the combine, including serving as the prime mover. A power transfer mechanism 19 transfers rotational power from the engine 18 to these driven components.

FIXED DIAMETER BELT DRIVE MECHANISM

Figure 2:
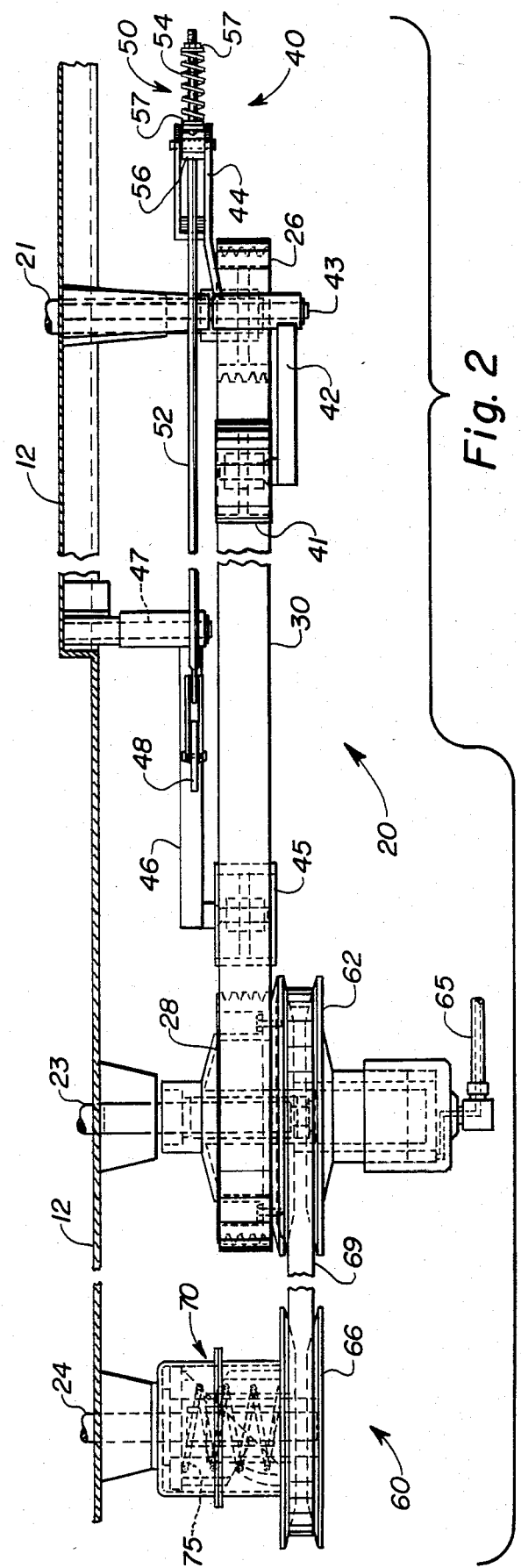
FIG. 2 is an enlarged cross-sectional view taken along lines 2—2 of FIG. 1 to show both the fixed and variable diameter drives, portions of each drive belt being broken away.

Referring now to FIGS. 1 and 2, it can be seen that the power transfer mechanism 19 can include both a fixed diameter belt drive 20 and a variable diameter belt drive 60. In the arrangement depicted in FIGS. 1 and 2, a fixed diameter drive 20 transfers rotational power from the power output shaft 21 of the engine 18 to an intermediate shaft 23, which with respect to the fixed drive 20 is a driven shaft but becomes a drive shaft for the variable drive 60. The rotational power is then transferred from the intermediate shaft 23 to the power input shaft 24 of the combine propulsion unit 25.

Figure 6:
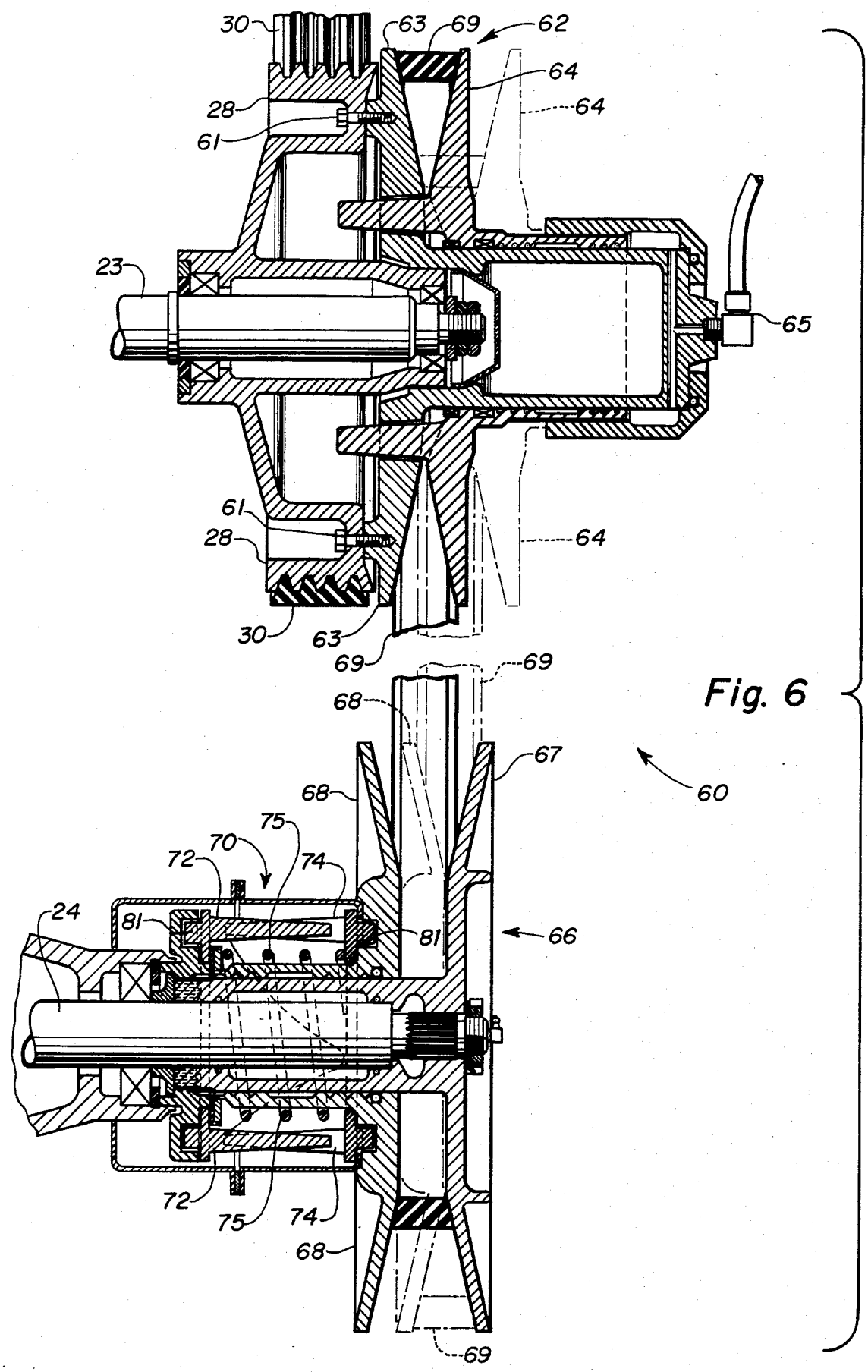
FIG. 6 is an enlarged partial cross-sectional view taken along lines 6—6 of FIG. 1 to show the variable diameter torque sensing power transfer assembly incorporating the principles of the instant invention, the relative position of the drive belt being shown under high speed operation while the relative position of the drive belt under low speed operation is shown in phantom.

The fixed diameter drive 20 is best seen in FIGS. 2–5. A first fixed diameter pulley 26 is affixed to the power output shaft 21 and rotatable therewith. A second fixed diameter pulley 28 is mounted on the intermediate shaft 23 for rotation therewith. An endless flexible belt 30 is entrained around both the first and second pulleys 26,28 to transfer rotational power therebetween. One skilled in the art will readily realize that the driven pulley 28 will transfer power to the intermediate shaft 23 if the pulley 28 is fixedly mounted for rotation with the shaft 23, such as by keys or splines; however, power could also be transferred to a remote location if the shaft 23 were a stub shaft with the pulley 28 mounted for rotation relative thereto as shown in FIG. 6.

Figure 3:
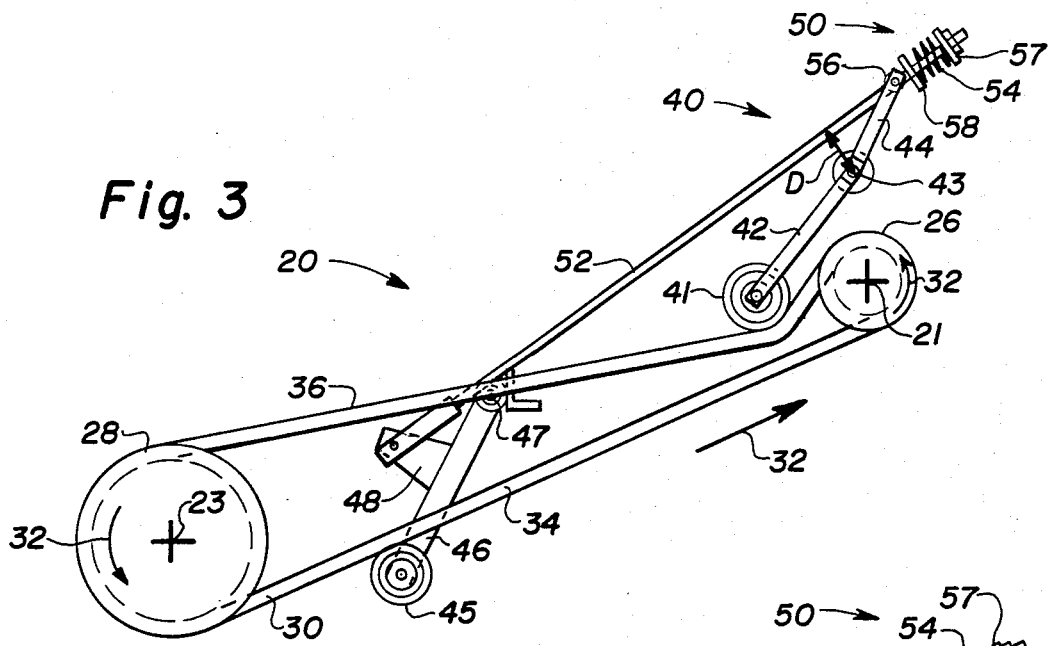
FIG. 3 is a diagrammatical view of the fixed diameter belt drive showing the operation of the tensioning apparatus under normal operating conditions.

Under normal operating conditions, as seen in FIG. 3, the first pulley 26 drives the second pulley 28 with rotation being in the direction being indicated by the arrows 32. As a result, one side or run 34 of the belt 30 will normally be taut, while the other run 36 will normally be slack. As is well known in the art, the amount of tension in the normally taut run 34 is directly related to the amount of power being transferred between the first and second pulleys 26,28.

To take up the slack in the run 36 of the belt 30, thereby keeping the belt 30 in proper engagement with the pulleys 26,28, a tensioning apparatus 40 is provided. As can be seen in FIGS. 2–5, the tensioning apparatus 40 includes a first tensioning pulley 41 engageable with the normally slack run 36 and a second tensioning pulley 45 engageable with the normally taut run 34. The first tensioning pulley 41 is rotatably supported on a support arm 42 pivotally mounted at pivot 43 to the frame 12. A pivot arm 44 is affixed to the support arm 42 and is also pivotally movable about the pivot 43 in a fixed relationship to the support arm 42. Likewise, the second tensioning pulley is rotatably supported on a support arm 46 pivotally mounted at pivot 47 to the frame 12. A second pivot arm 48 is affixed to the second support arm 46 at a location spaced from the second pivot 47.

A biasing mechanism 50 provides a biasing force to keep the tensioning pulleys 41,45 in engagement with the respective run 34,36 of the belt 30. The biasing mechanism 50 includes an elongated rod 52 pivotally interconnecting the first and second pivot arms 44,48 and a biasing spring 54. As is best seen in FIG. 2, the first pivot arm 44 is pivotaly connected to a tubular slide member 56 concentrically mounted on the elongated rod 52 adjacent the spring 54. The spring 54 is compressed to exert a biasing force between a stop 57, in the form of a washer and nut threaded onto the end of the elongated rod 52, and a retaining bracket 58 slidably mounted on the elongated rod 52 to be engageable with the slide member 56.

The biasing force exerted by the spring 54 against the first pivot arm 44 slidably and pivotally mounted on the elongated rod 52 via the slide member 56 urges the first tensioning pulley 41 into engagement with the normally slack run of the belt 30. The opposing biasing force of the spring 54 against the stop 57 urges the second tensioning pulley 45 into engagement with the normally taut run 34 of the belt 30. Because the biasing force exerted by the spring 54 is exerted along the axis of the elongated rod 52 through the pivot arms 44,48 at a point spaced from the respective pivots 43,47, the amount of tensioning force exerted by the tensioning pulleys 41,45 on the belt 30 is a function of the distance D between the axis of the elongated rod 52 and the respective pivot 43,47.

Under normal operating conditions as seen in FIG. 3, the spring 54 exerts an equal biasing force on the pivot arms 44,48; however, the amount of tensioning force exerted by the second tensioning pulley 45 on the normally taut run 34 of the belt 30 is minimal, approaching zero, because the distance between the axis of the elongated rod 52 and the second pivot 47 is substantially zero. On the other hand, the tensioning force exerted by the first tensioning pulley 41 on the normally slack run 36 is sufficient to take up the slack in the normally slack run 36 because of the significantly larger moment arm D between the elongated rod 52 and the first pivot 43. The lack of significant tensioning force exerted by the second tensioning pulley 45 on the normally taut run 34 permits the belt to have a longer working life than if a greater tensioning force were exerted thereon.

Under reverse power conditions, as will occur under certain circumstances, such as the combine going downhill, the normally driven pulley becomes the drive pulley and attempts to transfer rotational power to the normally drive pulley, i.e., the combine drives the engine. Under these reverse power conditions, the normally slack run 36 of the belt 30 becomes taut and, consequently, the normally taut run 34 becomes slack. To maintain proper driving contact between the belt 30 and the pulleys 41,45 and, thereby, permit the engine to break the driving power from the combine, it is desirable to take up the slack that would occur in the normally taut run 34 under these conditions.

Figure 4:
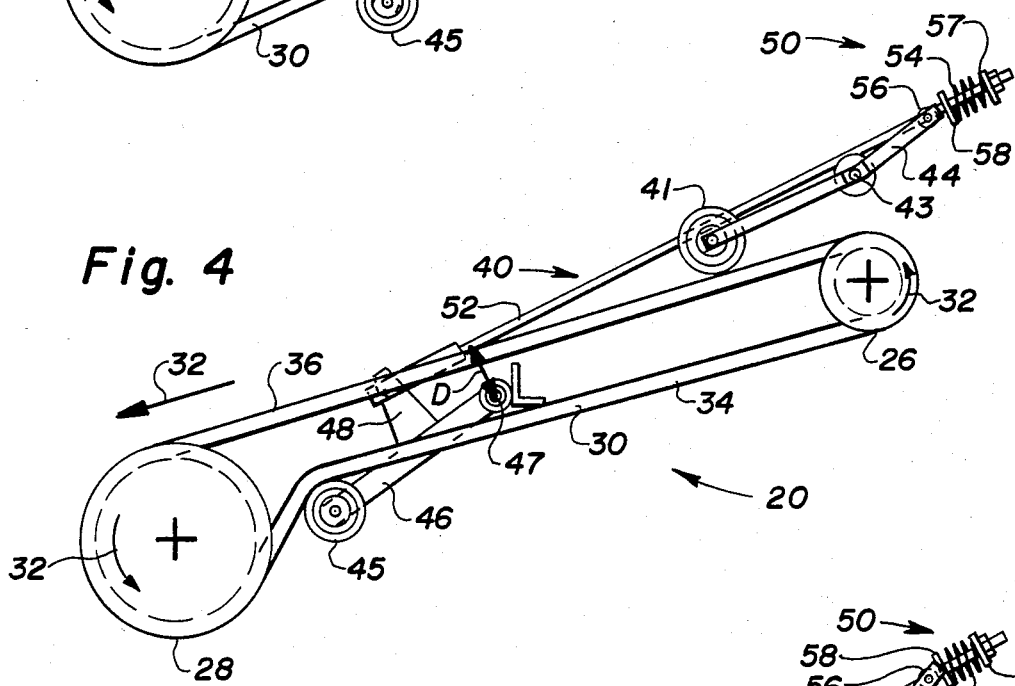
FIG. 4 is a diagrammatical view of the fixed diameter belt drive showing the operation of the tensioning apparatus under reverse power conditions.
Figure 5:
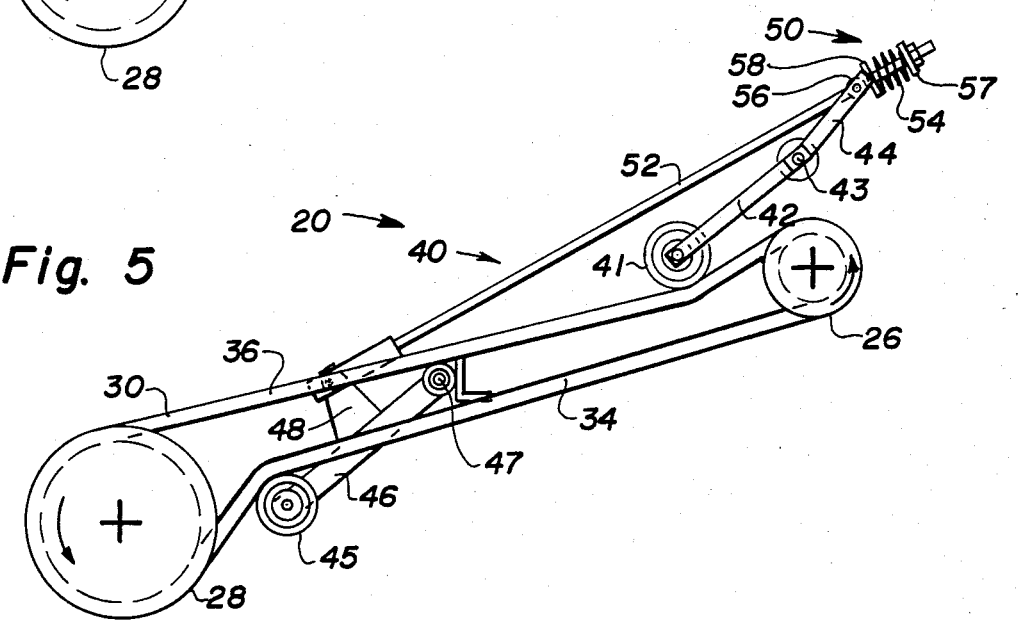
FIG. 5 is a diagrammatical view of the fixed diameter belt drive showing the relative positions of the tensioning members under no load conditions.

The inducement of tension into the normally slack run 36 will tighten the run 36 and move it into the position seen in FIG. 4. The movement of the belt 30 into this position causes the first tensioning pulley 41 to move upwardly into the position seen in FIG. 4, thereby causing a corresponding rotation of the pivot arm 44 about the first pivot 43. This movement of the first tensioning pulley 41 causes the elongated rod 52 to move in a generally rearward direction because of the spatial relationship between the pivot arm 44 and the support arm 42. This movement of the elongated rod 52 effects a corresponding rotation of the second support arm about the pivot 47 to move the second tensioning pulley 45 and take up the slack temporarily induced into the normally taut run 34.

Because of the spatial relationships between the various components of the tensioning apparatus 40, the movement of the elongated rod 52 during the transition from the normal operating condition to the reverse power condition effects a reduction of the distance D between the axis of the elongated rod 52 and the first pivot 43 while increasing the moment arm D between the elongated rod 52 and the second pivot 47. As a result, when the fixed diameter power transfer mechanism 20 is in the reverse power condition, as seen in FIG. 4, the tensioning force exerted by the first tensioning pulley on the now taut run 36 of the belt 30 is minimal, approaching zero, while the tensioning force exerted by the second tensioning pulley 45 is sufficient to take up the slack induced in the run 34. The relative positions of the components of the tensioning apparatus 40 during the transition between the normal operating condition and the reverse power condition can be seen in FIG. 5, which also indicates the relative position of these components during a no load condition.

As one skilled in the art will readily realize, the tensioning apparatus 40 provides a mechanism to take up the slack in the drive belt 30 of a fixed diameter drive mechanism 20 in either run 34,36 of the belt 30 in automatic response to the tension induced in the respective run 34,36 of the belt 30. Furthermore, one skilled in the art will readily realize that the tensioning apparatus 40 minimizes the tensioning forces exerted on the taut run of the drive belt 30 to provide an increased working life thereof, irrespective of which run 34,36 of the belt 30 is taut.

VARIABLE DIAMETER BELT DRIVE MECHANISM

Referring now to FIGS. 1, 2 and 6, a torque sensing variable diameter belt drive mechanism 60 can be seen. A first variable diameter sheave 62 comprises a fixed sheave half 63 fixed to the second pulley 28 by fastening means, such as screws 61, and rotatable on the shaft 23, and a movable sheave half 64 mounted on the shaft 23 for rotation with the fixed half 63 but movable along the axis of the shaft 23 relative thereto. A hydraulic control mechanism 65 enables the movable sheave half 64 to be axially selectively positionable relative to the fixed half 63 to change the distance between the fixed half 63 and the movable half 64 and, thereby change the effective diameter of the first variable diameter sheave 62 between a high speed position seen in solid lines and a low speed position seen in phantom.

A second variable diameter sheave 66 is mounted on the power input shaft 24 and includes a fixed sheave half 67 mounted on the shaft 24 for rotation therewith and a movable sheave half 68. As is known in the art, the movable sheave half 68 of the driven sheave 66 in a torque sensing variable diameter drive is free to move both axially and rotatably relative to the fixed sheave half 67. The fixed sheave half 67 normally drives the movable sheave half 68 through a torque sensing mechanism 70 so as to be rotatable therewith as a unitary sheave assembly 66. An endless flexible belt 69 is entrained between the first and second variable diameter sheaves 62,66 to transfer rotational power therebetween.

Figure 7:
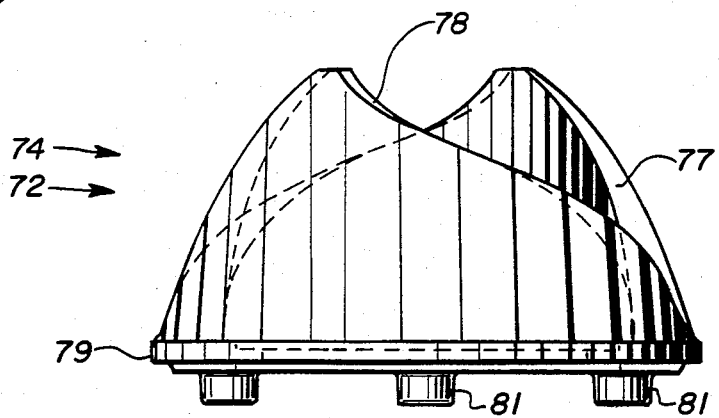
FIG. 7 is a side view of a cam member used in the driven sheave assembly of the variable diameter belt drive.
Figure 8:
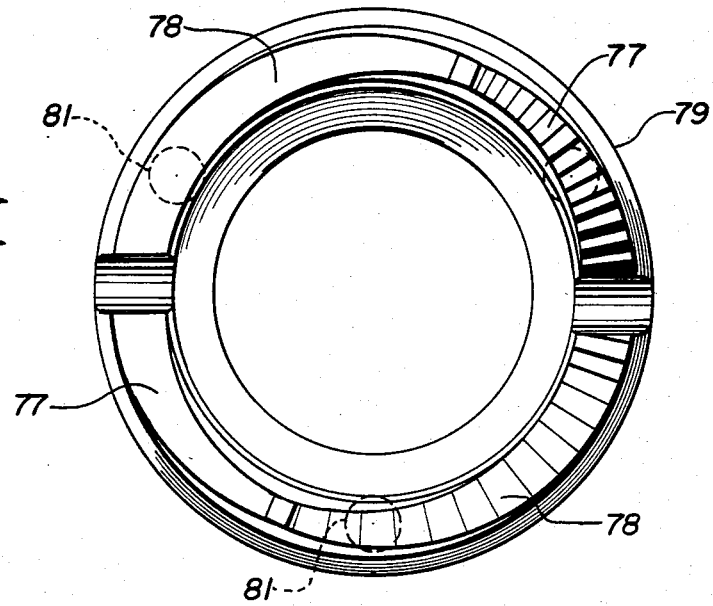
FIG. 8 is a top plan view of the cam member seen in FIG. 7.

The torque sensing mechanism 70 includes a first cam member 72, seen in FIGS. 6–8, connected to the fixed sheave half 67 and rotatable therewith. A second cam member 74 is connected to the movable sheave half 68 for rotation therewith. A spring 75 concentrically mounted on the power input shaft 24 urges the first and second cam members 72,74 apart, thereby urging the movable sheave half 68 toward the first sheave half 67. As can be seen in FIGS. 6–8, each cam member 72,74 includes a pair of first cam surfaces 77, a pair of second cam surfaces 78 and a base member 79 having tabs 81 engageable with corresponding indentations in the respective sheave halves 67,68 to effect rotation of the respective cam member 72,74 therewith.

Under the aforesaid normal operating conditions, corresponding first cam surfaces 77 on the first and second cam members 72,74 are engaged to cause the movable sheave half 68 to rotate with the fixed sheave half 67. Any rotational movement of the movable sheave half 68 relative to the fixed sheave half 67, due to a change in the power requirement for the power input shaft 24, as is known in the art, causes the corresponding first cam surfaces 77 to slide over each other and effect an axial movement of the movable sheave half 68 relative to the fixed sheave half 67 which, in turn, causes a change in the tension in the endless flexible belt 69.

Under the aforesaid reverse power conditions, the torque sensing mechanism 70 finds itself as being mounted on the drive shaft, rather than the driven shaft and, accordingly, the torque sensing characteristics are different. To provide proper tensioning in the belt 69 under the aforesaid reverse power conditions, each cam member 72,74 is provided with an asymmetrical second cam surface 78 which interengage, because the fixed sheave half 67 is now driving the movable sheave half 68, to cause the movable sheave half 68 and the fixed sheave half 67 to rotate as a unitary sheave assembly 66. The asymmetrical second cam surface 78 provides a different amount of axial movement of the movable sheave half 68 per given increment of rotation thereof relative to the fixed sheave half 67 than the first cam surface 77 to provide the proper torque sensing properties under the reverse power conditions.

Figure 9:
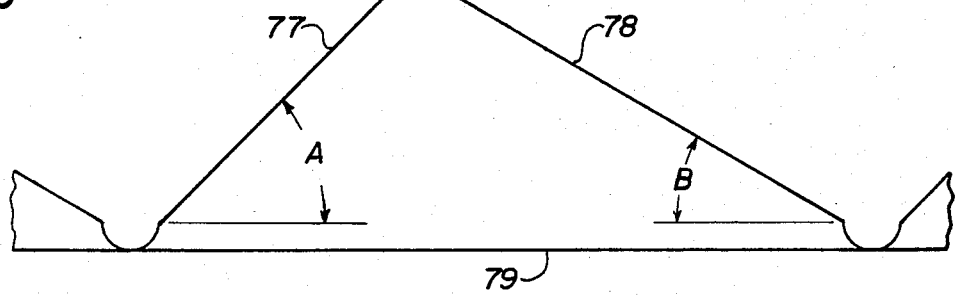
FIG. 9 is a schematic drawing showing the relative positions of the cam surfaces on the cam members seen in FIG. 7.

The flat pattern layout of the asymmetrical first and second cam surfaces 77,78 can be schematically seen in FIG. 9. In the preferred embodiment described above, it has been found that angle A, the angle between the first cam surface 77 and the base member 79 should be approximately 45°, while angle B, the angle between the second cam surface 78 and the base member 79, should be approximately 30°, to give good results under both normal operating conditions and reverse power conditions.

It will be understood that various changes in the details, material, steps and arrangement of parts which have been described and illustrated to explain the nature of the invention, will occur to and may be made by those skilled in the art upon a reading of the disclosure within the principles and scope of the invention. The foregoing description illustrates preferred embodiments of the invention. However, concepts, as based on such a description, may be employed in other embodiments without departing from the scope of the invention. Accordingly, the following claims are intended to protect the invention broadly, as well as in the specific form shown herein.

Having thus described the invention, what is claimed is:

1. In a crop harvesting machine having a frame; a crop harvesting mechanism mounted on said frame and being operably driven by a rotational power input mechanism, said crop harvesting mechanism having a power input shaft for receiving rotational power delivered thereto; power means mounted on said frame to provide rotational power for driving said crop harvesting mechanism, said power means having a power output shaft for delivering rotational power from said power means; power transfer means for transferring rotational power from said power output shaft to said power input shaft, said power means having a first power transfer member affixed to said power output shaft, a second power transfer member affixed to said power input shaft and an endless flexible member entrained between said first and second power transfer members to transfer rotational power therebetween, said flexible member having a normally slack run and a normally taut run; and tensioning apparatus operably engaged with said flexible member to maintain proper tension therein, an improved tensioning apparatus comprising, a first tensioning member pivotally mounted on said frame by a first pivot and engageable with said flexible member on said normally slack run;

a second tensioning member pivotally mounted on said frame by a second pivot and engageable with said flexible member on said normally taut run;

connecting means interconnecting said first and second tensioning members such that pivotal movement of said tensioning members effects an inversely proportional change in the respective distance between said connecting means and said first and second pivots; and biasing means associated with said connecting means to create a substantially constant force on said connecting means and effect a tensioning force exerted by said first and second tensioning members on said flexible member, said tensioning force being variable and a function of the distance between said connecting means and the respective said pivot, the tensioning force exerted by said first and second tensioning members being inversely proportional.

2. The crop harvesting machine of claim 1 wherein both said first and second tensioning members includes a support arm pivotally mounted on said frame, an engaging member rotatably mounted on said support arm for engagement with said flexible member and a pivot arm connected to said support arm.

3. The crop harvesting machine of claim 2 wherein said connecting means operably interconnects each said pivot arm to induce a pivotal movement of the respective said support arm and urge the respective said engaging member into engagement with said flexible member.

4. The crop harvesting machine of claim 3 wherein said connecting means includes an elongated rod pivotally connected to both said pivot arms, said biasing means including a spring operably connected to said elongated rod to urge the respective said engaging members into engagement with said flexible member.

5. The crop harvesting machine of claim 4 wherein said spring is positioned within a bracket engageable with one of said pivot arms to exert a biasing force thereon, said spring also being engageable with a stop affixed to said elongated rod to exert a biasing force on the other of said pivot arms, each said pivot arm having an equal biasing force exerted thereon by said spring.

6. The crop harvesting machine of claim 5 wherein said first and second tensioning member pivot arms are positioned relative to the corresponding pivots such that, when said first engaging member is engaging said flexible member under normal operating conditions wherein said first tensioning member is tensioning the slack run of said flexible member, said elongated rod is spaced a first distance away from the first tensioning member pivot and said elongated rod is spaced from said second tensioning member pivot a second distance less than said first distance.

7. The crop harvesting machine of claim 6 wherein said second tensioning member pivot arm is positioned relative to the corresponding pivot such that said elongated rod is positioned immediately adjacent said second tensioning member pivot under said normal operating conditions to minimize the tensioning force exerted by said second engaging member.

8. The crop harvesting machine of claim 7 wherein said biasing means is arranged such that, under reverse power conditions wherein the normally slack run of said flexible member becomes the taut run and the normally taut run becomes the slack run, the tension induced in the normally slack run of said flexible member causes said first tensioning member to rotate about the corresponding pivot and effect a movement of said second tensioning member through said biasing means to take up the corresponding slack induced in the normally taut run of said flexible member.

9. The crop harvesting machine of claim 8 wherein said biasing means is connected to the respective said pivot arms in such a manner as to decrease said first distance between said elongated rod and the first pivot and increase said second distance between said elongated rod and the second pivot during the transition from said normal operating condition to said reverse power condition.

10. The crop harvesting machine of claim 9 wherein said first distance is less than said second distance under said reverse power conditions.

11. The crop harvesting machine of claim 10 wherein said elongated rod is positioned adjacent said first tensioning member pivot to minimize the tensioning force exerted by the corresponding said engaging member under said reverse power conditions.

12. The crop harvesting machine of claim 11 wherein said first tensioning member is pivotally mounted on said frame proximate to said first power transfer member, said second tensioning member being pivotally mounted on said frame proximate to said second power transfer member.

13. The crop harvesting machine of claim 12 wherein said flexible member is a belt and said first and second power transfer members are pulleys engaged with said belt.

14. The crop harvesting machine of claim 13 wherein said spring is mounted on said elongated rod for engagement with said first tensioning member pivot arm, said stop being a nut and washer threaded onto said elongated rod.

15. A crop harvesting machine of claim 10 wherein said bracket is slidably mounted on said elongated rod between said stop and said first tensioning member pivot arm.

16. The crop harvesting machine of claim 15 wherein said first tensioning member pivot arm is pivotally connected to a tubular slide member slidably mounted on said elongated rod for engagement with said bracket.

17. In a drive mechanism having a power input shaft for receiving rotational power delivered thereto; power means to provide rotational power for driving said power input shaft, said power means having a power output shaft for delivering rotational power from said power means; power transfer means for transferring rotational power from said power output shaft to said power input shaft, said power means having a first power transfer member affixed to said power output shaft, a second power transfer member affixed to said power input shaft and an endless flexible member entrained between said first and second power transfer members to transfer rotational power therebetween, said flexible member having a normally slack run and a normally taut run; and tensioning apparatus operably engaged with said flexible member to maintain proper tension therein, an improved tensioning apparatus comprising, a first tensioning member pivotally mounted on a support frame and engageable with said flexible member on said normally slack run;

a second tensioning member pivotally mounted on said support frame and engageable with said flexible member on said normally taut run; and biasing means connected to said first and second tensioning members to urge each respective tensioning member into engagement with said flexible member in inverse proportion to one another, such that the tensioning force exerted by said second tensioning member on said flexible member increases only when the tensioning force exerted by said first tensioning member on said flexible member decreases, said biasing means including an elongated rod interconnecting said first and second tensioning members along a line movable relative to the corresponding said pivots to vary the tensioning force exerted by the respective said tensioning member, the magnitude of said tensioning force being directly related to the distance between said elongated rod and the respective said pivot, the distance between said elongated rod and said second tensioning member pivot being of minimal magnitude under normal operating conditions to minimize the tensioning force exerted on the normally taut run.

18. The drive mechanism of claim 17 wherein, under reverse power conditions in which the normally slack run of said flexible member becomes taut and the normally taut run becomes slack, the tension induced in the normally slack run causes said first tensioning member to rotate about the corresponding pivot and effect a movement of said second tensioning member through said elongated rod to take up the corresponding slack induced in the normally taut run, the distance between said elongated rod and said second tensioning member pivot increasing to increase the tensioning force exerted by the second tensioning member on said flexible member while the distance between said elongated rod and said first tensioning member decreases to minimize the tensioning force exerted by said first tensioning member.

19. The drive mechanism of claim 18 wherein said biasing means further includes a single spring exerting a biasing force through said elongated rod to rotate both said first and second tensioning members about the respective pivots toward engagement with said flexible member.

* * * * *